US010052904B2

(12) United States Patent
Jackson et al.

(10) Patent No.: US 10,052,904 B2
(45) Date of Patent: Aug. 21, 2018

(54) SECURITY DOCUMENT CONTAINING AN AUTHENTICATION DEVICE

(75) Inventors: Wayne Kevin Jackson, Rosanna (AU); Francois Bauer, Saint Louis (FR)

(73) Assignee: NOTE PRINTING AUSTRALIA LIMITED, Craigieburn, Vic (AU)

( * ) Notice: Subject to any disclaimer, the term of this patent is extended or adjusted under 35 U.S.C. 154(b) by 2287 days.

(21) Appl. No.: 12/444,168

(22) PCT Filed: Oct. 4, 2007

(86) PCT No.: PCT/AU2007/001472
§ 371 (c)(1),
(2), (4) Date: Nov. 24, 2009

(87) PCT Pub. No.: WO2008/040056
PCT Pub. Date: Apr. 10, 2008

(65) Prior Publication Data

US 2010/0084850 A1 Apr. 8, 2010

(30) Foreign Application Priority Data

Oct. 4, 2006 (AU) ................................ 2006905490

(51) Int. Cl.
*B42D 15/00* (2006.01)
*B42D 15/10* (2006.01)
(Continued)

(52) U.S. Cl.
CPC ........... *B42D 25/415* (2014.10); *B42D 25/29* (2014.10); *B42D 25/364* (2014.10);
(Continued)

(58) Field of Classification Search
CPC ........ B42D 15/00; B42D 15/10; B42D 25/29; B42D 2033/12; B42D 2033/46;
(Continued)

(56) References Cited

U.S. PATENT DOCUMENTS 4,536,014 A * 8/1985 Boutaleb ............... G02F 1/1313 283/83
4,763,927 A 8/1988 Schneider
(Continued)

FOREIGN PATENT DOCUMENTS

EP 1617491 A2 * 1/2006
FR 2693890 5/1994
(Continued)

OTHER PUBLICATIONS

J.A. Baer, Objective Means of Determining Magazine Readership, Jul. 1982, SRI International, pp. 20-24.*

*Primary Examiner* — Justin V Lewis
(74) *Attorney, Agent, or Firm* — Fay Sharpe LLP

(57) ABSTRACT

A flexible security document is provided which contains an authentication device including: a) source of electrical potential (5), the source including a piezoelectric polymeric material including at least one terpolymer of vinylidene fluoride (VDF), trifluoroethylene (TrFE) and a halogenated ethylene based monomer containing at least one non-fluorine halogen atom, the source of electrical potential being activated by mechanical deformation; b) reporter element (3) including a material capable of switching electrically between a first state and a second state, the difference between the first state and the second state being able to be perceived by an unaided human; and c) conducting elements (8) electrically connecting the source of electrical potential and the reporter element to produce an electric circuit. The reporter element (3) may take a number of different forms, such as a light emitting device which lights up or undergoes color change when activated by the source of electrical potential to provide an indication of authenticity. In a particularly preferred embodiment, the flexible security
(Continued)

document is a banknote and the source of electrical potential is applied by printing.

17 Claims, 3 Drawing Sheets

(51) Int. Cl.

| | |
|---|---|
| ***G09C 3/00*** | (2006.01) |
| ***B42D 25/415*** | (2014.01) |
| ***B42D 25/364*** | (2014.01) |
| ***B42D 25/455*** | (2014.01) |
| ***B42D 25/29*** | (2014.01) |
| ***G07D 7/181*** | (2016.01) |

(52) U.S. Cl.
CPC ........... *B42D 25/455* (2014.10); *G07D 7/181* (2017.05); *B42D 2033/12* (2013.01); *B42D 2033/26* (2013.01); *B42D 2033/46* (2013.01); *Y10T 29/49155* (2015.01)

(58) Field of Classification Search
CPC ..... B42D 2033/26; B41M 3/14; B41M 3/148; B41M 1/12; B41M 5/00; B41J 2/045; G06K 5/00; G06K 19/00; G06K 19/02; G06K 19/06; G06K 9/00; G06K 9/36; G06K 9/46; B44F 1/10; B44C 1/17; G03G 7/00; G07D 7/18; Y10T 29/49155
USPC ...... 283/56, 67, 70, 72, 74, 83, 94, 98, 901; 347/68, 69, 70, 71, 72; 235/380, 487, 235/488, 492; 382/100, 135, 136, 137, 382/138, 139, 140, 232; 428/29, 195.1, 428/916
See application file for complete search history.

(56) References Cited

U.S. PATENT DOCUMENTS

| | | | | |
|---|---|---|---|---|
| 5,566,982 | A | 10/1996 | Lehureau et al. | |
| 5,599,046 | A * | 2/1997 | Behm et al. | 283/83 |
| 6,659,351 | B1 | 12/2003 | Bailieu | |
| 6,699,629 | B1 * | 3/2004 | Helber et al. | 430/22 |
| 6,787,238 | B2 | 9/2004 | Zhang et al. | |
| 7,078,101 | B1 * | 7/2006 | Ramotowski | C08F 214/22 428/421 |
| 2003/0122371 | A1 * | 7/2003 | Rochford | G09F 3/02 283/101 |
| 2003/0169468 | A1 * | 9/2003 | Menz | G07D 7/0013 283/86 |
| 2004/0070195 | A1 * | 4/2004 | Nelson et al. | 283/83 |
| 2005/0046915 | A1 * | 3/2005 | Takizawa | G03F 7/001 359/3 |
| 2005/0104365 | A1 * | 5/2005 | Haas | B29C 44/22 283/72 |
| 2007/0177131 | A1 * | 8/2007 | Hansen | G07D 7/0006 356/71 |

FOREIGN PATENT DOCUMENTS

| | | | | |
|---|---|---|---|---|
| GB | 2257091 A * | 1/1993 | B42D 15/022 |
| JP | 2004078731 | 3/1994 | |
| WO | WO 9901292 A1 * | 1/1999 | B42D 25/355 |

* cited by examiner

SECURITY DOCUMENT CONTAINING AN AUTHENTICATION DEVICE

FIELD OF THE INVENTION

The present invention relates to security documents containing an authentication device. More specifically, the invention relates to security documents containing an authentication device that can be used to indicate the authenticity of the security document without recourse to complementary devices. The security documents of the present invention can be authenticated by flexing or other mechanical deformation.

BACKGROUND TO THE INVENTION

There are a number of security documents used regularly in everyday life which require authentication at one point or another. For example, security documents such as identity cards used in industry, as well as passports are regularly required to be checked to ensure that they are genuine and not a clever forgery aimed at deceiving the person to whom the security document is produced as verification of identity. Similarly, exchangeable documents such as bills of lading, cheques, bonds, share certificates and other negotiable instruments as well as hard currency such as banknotes are regularly required to be proven to be authentic when they are exchanged. Accordingly, a number of techniques have been developed to ensure the authenticity of security documents of this type.

It is known to incorporate sophisticated design features into a number of security documents such as currency and banknotes with the aim of making them difficult to copy. Alternatively it has been known to incorporate watermarks or other design features such as metallic threads that can be identified by human inspection of the security document. Unfortunately a number of these "first wave" authentication techniques have become redundant as technological advances have meant that forgers have been able to reproduce security documents including these features rendering them redundant as a means of providing security document authenticity.

In order to stay ahead of forgers a number of other design features have been developed that rely on the use of complementary technology to determine the presence of the design feature in the security document to be authenticated. Examples of such features include the presence of a magnetic strip containing information that can be read by a scanner (an example of this is a barcode). Technology of this type requires the use of a reading means that can verify the authenticity of the strip in the security document. Other techniques include the use of fluorescent dyes that only fluoresce when exposed to light of a specific wavelength (typically ultraviolet (UV)) which once again requires the presence of a UV lamp in order to authenticate the security document. It has also been known to incorporate certain rare earth elements that have multiple-photon mechanisms that can be activated by lasers at specific wavelengths into the security document. Whilst these have been successful in overcoming forgeries to a greater or lesser extent they all still require the presence of a complementary device of some sort to determine the authenticity of the security document. Whilst this is acceptable in certain high security arrangements where unit cost is not a critical issue and the point of authentication of the security document can be accurately defined (such as with a passport at the customs check at an airport), these techniques are not amenable in all circumstances. In particular they are unsuitable in circumstances where there are an unusually high number of transactions or in circumstances where the geographical location of the transaction is not well defined. An example of such a transaction is a transaction involving the handing over of money.

Accordingly there is still the need to develop alternative techniques for the authentication of security documents especially techniques that do not require the use of a complementary device in the authentication process.

In the past the use of piezoelectric films has been proposed for use in relatively stiff security documents. For instance, U.S. Pat. No. 5,566,982 and JP 2004 78731 disclose laminated piezoelectric films suitable for application to an identity card or credit card. However, such films are relatively rigid and inflexible and, being crystalline, become hard and brittle when stretched, and have been found not to be appropriate in the case of more flexible documents comprising flexible sheets, such as banknotes, which are often folded and crumpled in use. It is therefore desirable to develop better materials and methods that enable piezoelectric polymeric material to be applied to documents of such a flexible nature.

Throughout this specification reference may be made to published documents for the purpose of describing various aspects of the invention. However, no admission is made that any reference cited in this specification constitutes prior art. In particular, it will be understood that the reference to any published document herein does not constitute an admission that any of these documents forms part of the common general knowledge in the art in any country.

Throughout the description and claims of this specification, the word "comprise" and variations of the word, such as "comprising" and "comprises", is not intended to exclude other additives, components, integers or steps.

SUMMARY OF THE INVENTION

According to one aspect of the present invention there is provided a flexible security document containing an authentication device, the authentication device including:

a) a printed source of electrical potential, the source of electrical potential including a piezoelectric polymeric material including at least one terpolymer of vinylidene fluoride (VDF), trifluoroethylene (TrFE) and a halogenated ethylene based monomer containing at least one non-fluorine halogen atom, the source of electrical potential being activated by mechanical deformation of the flexible security document;

b) a reporter element including a material capable of switching electrically between a first state and a second state, the difference between the first state and the second state being able to be perceived by an unaided human; and c) conducting elements electrically connecting the source of electrical potential and the reporter element to produce an electric circuit.

Advantageously, the printed piezoelectric polymeric material is flexible so that it can be used on flexible security documents, such as bank notes, which are liable to be folded and crumpled in use.

The reporter element must be capable of switching electrically between a first state and a second state with the difference between the two states being able to be detected by an unaided person. The difference between the two states may be any of a number of differences such as colour, light, heat, auditory differences and the like.

The material in the reporter element may be selected such that the first state and the second state are optical states that are different in terms of ocular perception. In one form of this embodiment the reporter element may be an organic light emitting diode (OLED). In another form of this embodiment the reporter element may be a bi stable liquid crystal device. In these embodiments a number of changes may occur with the reporter element. For example the reporter element may light up, it may undergo a colour change, or it may undergo a change in tone.

Another aspect of the invention results from a finding that terpolymeric material can be supplied in a solution for printing, and a piezoelectric terpolymeric material which is suitable for printing is also therefore provided. This facilitates the application of the piezoelectric terpolymeric material to the security document, including the ability to print the material into a variety of designs shapes, sizes and depths.

In one preferred embodiment of the invention the source of electrical potential comprises a printable piezoelectric polymeric material of vinylidene fluoride (VDF), trifluoroethylene (TrFE) and a halogenated ethylene based monomer containing at least one non-fluorine halogen atom. In another embodiment of the invention, the source of electrical potential includes a mixture containing a piezoelectric polymeric material including at least one terpolymer of vinylidene fluoride (VDF), trifluoroethylene (TrFE) and a halogenated ethylene based monomer containing at least one non-fluorine halogen atom, and a copolymer of vinylidene fluoride (VDF) and trifluoroethylene (TrFE).

According to another aspect of the invention there is provided a printable piezoelectric material including at least one terpolymer dissolved in a solvent, wherein the terpolymer comprises vinylidene fluoride (VDF), trifluoroethylene (TrFE) and a halogenated ethylene based monomer containing at least one non-fluorine halogen atom.

The halogenated ethylene based monomer containing at least one non-fluorine halogen atom may be chosen from any of a number of halogenated ethylene monomers with chlorinated ethylene monomers being found to be particularly suitable. Examples of suitable chlorinated ethylene monomers include chlorofluoroethylene (CFE) and chlorotrifluoroethylene (CTFE).

In one embodiment of the invention the halogenated ethylene based monomer containing at least one non-fluorine halogen atom is chlorofluoroethylene (CFE). The chlorofluoroethylene (CFE) used in the invention may be in the form of 1-chloro-2-fluoroethylene, 1-chloro-1-fluoroethylene or a mixture thereof. Accordingly in one embodiment the source of electrical potential includes a piezoelectric polymeric material of vinylidene fluoride (VDF), trifluoroethylene (TrFE) and chlorofluoroethylene (CFE). The relative mole ratios of the components may vary widely with the exact mole ratio chosen depending upon the desired end use application. An appropriate mole ratio may be selected to achieve the desired modulus of elasticity (flexibility) and electrical potential properties in the finished product.

In one form of this embodiment the piezoelectric polymeric material contains 55 mole % to 80 mole % vinylidene fluoride (VDF), 20 mole % to 45 mole % trifluoroethylene (TrFE) and 0.5 mole % to 5 mole % chlorofluoroethylene (CFE). In another form of this embodiment the piezoelectric polymeric material contains 58 mole % to 66 mole % vinylidene fluoride (VDF), 30 mole % to 38 mole % trifluoroethylene (TrFE) and 3 mole % to 5 mole % chlorofluoroethylene (CFE). In yet an even further embodiment the piezoelectric polymeric material contains 60 mole % to 64 mole % vinylidene fluoride (VDF), 33 mole % to 35 mole % trifluoroethylene (TrFE) and 3.5 mole % to 4.5 mole % chlorofluoroethylene (CFE). In one specific embodiment the piezoelectric polymeric material contains about 62 mole % vinylidene fluoride (VDF), 34 mole % trifluoroethylene (TrFE) and 4 mole % chlorofluoroethylene (CFE).

In one embodiment of the invention the halogenated ethylene based monomer containing at least one non-fluorine halogen atom is chlorotrifluoroethylene (CTFE). Accordingly in another embodiment the source of electrical potential includes a piezoelectric polymeric material of vinylidene fluoride (VDF), trifluoroethylene (TrFE) and chlorotrifluoroethylene (CTFE). Once again the relative mole ratios of the components may vary widely with the exact mole ratio chosen depending upon the desired end use application. As before, an appropriate mole ratio may be selected to achieve the desired modulus of elasticity (flexibility) and electrical potential properties in the finished product.

In one form of this embodiment the piezoelectric polymeric material contains 55 mole % to 80 mole % vinylidene fluoride (VDF), 20 mole % to 45 mole % trifluoroethylene (TrFE) 0.5 mole % to 5 mole % chlorotrifluoroethylene (CTFE). In another form of this embodiment the piezoelectric polymeric material contains 58 mole % to 66 mole % vinylidene fluoride (VDF), 30 mole % to 38 mole % trifluoroethylene (TrFE) and 3 mole % to 5 mole % chlorotrifluoroethylene (CTFE).

In yet an even further form the piezoelectric polymeric material contains 60 mole % to 64 mole % vinylidene fluoride (VDF), 33 mole % to 35 mole % trifluoroethylene (TrFE) and 3.5 mole % to 4.5 mole % chlorotrifluoroethylene (CTFE). In one specific embodiment the piezoelectric polymeric material contains about 62 mole % vinylidene fluoride (VDF), about 34 mole % trifluoroethylene (TrFE) and about 4 mole % chlorotrifluoroethylene (CTFE).

The source of electrical potential may be configured in a number of ways and may have any of a number of geometries depending upon the end use application. Nevertheless typically the source of electrical potential has a thickness of from 6-12 μm. In one specific embodiment the source of electrical potential has a thickness of from 8-10 μm. It is also preferred that the source of electrical potential has dimensions in the order of 0.5 $cm^2$ to 10 $cm^2$, even more preferably 4 $cm^2$ to 7 $cm^2$.

The security document of the invention incorporates conducting elements to form an electric circuit between the source of electric potential and the reporter element. The conducting elements may take any suitable form although in one embodiment the conducting elements are electrically conducting polymeric layers located either side of the source of electrical potential. One or both of the electrically conducting polymeric layers may include one or more circuit elements, such as a transistor, switch, diode, capacitor, resistor or inductor.

In one embodiment the security document is selected from the group consisting of those of a flexible nature such as currency, security identification documents, bills of exchange, bills of lading, travel and entertainment tickets, deeds of title, academic transcripts, labels and cheques. In one specific embodiment the security document is currency.

In one preferred embodiment the material in the reporter element is selected such that the first state and the second state are auditory states that are different in terms of auditory perception.

In this embodiment when switching between the first state and the second state a detectable noise is created.

In yet an even further aspect the present invention provides a method of manufacturing a flexible security document containing a source of electrical potential, the method including:

a) providing a flexible security document substrate having an insulated surface for application of an authentication device, b) applying a first electrically conducting layer to the insulated surface;

c) printing a source of electrical potential onto a portion of the electrically conducting layer, the source of electrical potential including a piezoelectric polymeric material consisting of vinylidene fluoride (VDF), trifluoroethylene (TrFE) and a halogenated ethylene based monomer containing at least one non-fluorine halogen atom, d) applying a second electrically conducting layer to the source of electrical potential;

e) annealing the security document;

f) subjecting the security document to an external electrical field to pole the device; and g) applying a reporter element to the security document in electrical connection with the source of electrical potential, the reporter element including a material capable of switching electrically between a first state and a second state, the difference between the first state and the second state being able to be perceived by an unaided human.

The first electrically conducting layer may be applied using any method well known in the art and may be made of any suitable material. In one embodiment, applying the first electrically conducting layer to the insulated surface includes applying a conducting polymer to the surface. One or both of the electrically conducting layers may include one or more circuit elements, such as a transistor, switch, diode, capacitor, resistor and inductor.

In one preferred embodiment, applying the source of electrical potential includes i) providing a solution of the piezoelectric polymeric material in a suitable solvent;

ii) printing the solution onto the electrically conducting layer; and iii) drying the printed solution.

The solution of the piezoelectric polymeric material in a suitable solvent is typically provided by dissolving the piezoelectric polymeric material of choice in a solvent selected such that it dissolves the piezoelectric polymeric material. The exact choice of solvent will therefore depend upon the piezoelectric polymeric material chosen. In one embodiment the solvent is an organic solvent. In one form of this embodiment the organic solvent is a mixture of Methyl iso butyl ketone and butyl glycol 10-20.

Once the solution has been provided, the solution is then printed onto the security document. In one form of this embodiment the solution is printed as a single pass with a 44 T screen mesh. In another form of this embodiment the solution is printed with two passes of a 77 T screen mesh.

After application of the solution, the printed solution is allowed to dry. In one form of this embodiment the printed solution is dried to a solvent retention level of less than 5 $mg/m^3$.

A second electrically conducting layer is then applied in much the same manner as the first electrically conducting layer.

Following application of the printed solution, the security document is then annealed to promote crystal formation in the source of electrical potential which typically increases the power output of the device. Any suitable annealing technique may be used. Preferably the annealing is performed at a temperature less than 150° C., and even more preferably less than 100° C. In its most preferred form, the security document is annealed at a temperature from 80° C. to 100° C.

In addition to annealing, the power source is also subjected to an external electrical field to induce a dipole in the source. This may be carried out in a number of ways but typically involves subjecting the security document to an external electrical field. The external electric field is typically 45-50 V per μm of thickness of the source of electrical potential.

The reporter element may be applied in a number of different ways. In one embodiment the reporter element is applied by printing.

DETAILED DESCRIPTION OF THE INVENTION

Figure 1:
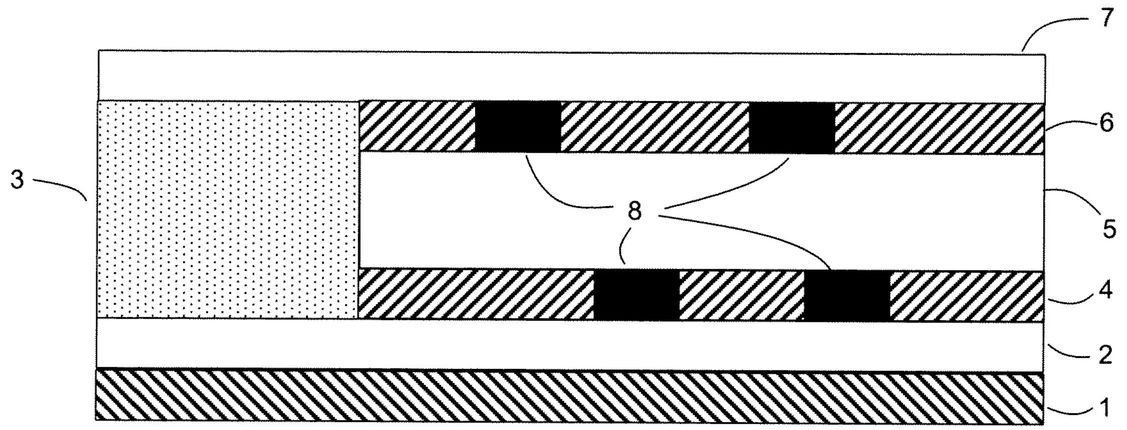
FIG. 1 illustrates an exemplary security document of the invention.

The present invention, and embodiments thereof, will now be described in more detail.

Security Documents of the Invention

The present invention provides a way in which security documents can be authenticated without the use of complementary devices. The invention therefore finds application with a broad range of security documents as a means of authentication of the security documents. The invention is particularly attractive as it does not exhibit the cost or geographical restraints incurred by some of the other authentication techniques utilised in the art. The security document can in principle be any security document where there is a desire to authenticate the security document before a transaction based on the authenticity of the security document is carried out. For example the security document may be currency, security identification documents, bills of exchange, bills of lading, travel and entertainment tickets, deeds of title, academic transcripts, labels and cheques. It is found that the invention has particular application to currency as its authenticity is regularly required to be confirmed in everyday life.

The security document must be flexible, as in the present invention the source of electrical potential provided is activated by mechanical deformation of the security document. Nevertheless the security document may be made of any suitable flexible material, with paper or polymeric materials being found to be particularly suitable. The security document may be of any suitable shape and structural geometry however it is generally desirable that the security document be substantially flat as in this form the authentication device is most readily applied. The security document must also be sufficiently robust such that mechanical deformation of the security document required to activate the source of electrical potential does not break or impinge upon the structural integrity of the security document. This is particularly important for security documents which are used repeatedly, such as bank notes. It is also desirable that the surface of the security document to which the authentication device is attached or applied is insulated such that there is no loss of electrical potential away from the electric circuit created in the security document authentication device.

The security document authentication device includes a source of electrical potential that is activated by mechanical deformation or stress of the security document. The source of electrical potential includes a piezoelectric polymeric material comprising vinylidene fluoride (VDF), trifluoroethylene (TrFE) and a halogenated ethylene based monomer containing at least one non-fluorine halogen atom. These materials are found to have sufficiently strong piezoelectric properties such that a suitable large electrical potential can be created upon deformation if an appropriate dipole has been created in the material. A region of a piezoelectric terpolymer on a bank note, for instance, can produce an electric current which is sufficient to activate a reporter element that can easily be detected by an unaided human.

A suitable piezoelectric polymeric material for incorporation into the source of electrical potential is a piezoelectric polymeric material of vinylidene fluoride (VDF), trifluoroethylene (TrFE) and a halogenated ethylene based monomer containing at least one non-fluorine halogen atom. A piezoelectric polymeric material of this type can readily be produced using polymerisation techniques, and by controlling the mole ratio of the monomer components to arrive at the desired final piezoelectric polymeric material composition. The relative mole ratios of the components may vary widely with the exact mole ratio chosen depending upon the desired end use application. An appropriate mole ratio may be selected to achieve the desired modulus of elasticity (flexibility) and electrical potential properties in the finished product. A suitable halogenated ethylene based monomer containing at least one non-fluorine halogen atom is chlorofluoroethylene (CFE). Another suitable halogenated ethylene based monomer containing at least one non-fluorine halogen atom is chlorotrifluoroethylene (CTFE).

When a piezoelectric polymeric material of vinylidene fluoride (VDF), trifluoroethylene (TrFE) and chlorofluoroethylene (CFE) is used as the piezoelectric polymeric material in the source of electrical potential, the piezoelectric polymeric material typically contains 55 mole % to 80 mole % vinylidene fluoride (VDF), 20 mole % to 45 mole % trifluoroethylene (TrFE) and 0.5 mole % to 5 mole % chlorofluoroethylene (CFE). In another form of this embodiment the piezoelectric polymeric material contains 58 mole % to 66 mole % vinylidene fluoride (VDF), 30 mole % to 38 mole % trifluoroethylene (TrFE) and 3 mole % to 5 mole % chlorofluoroethylene (CFE). In yet an even further form the piezoelectric polymeric material contains 60 mole % to 64 mole % vinylidene fluoride (VDF), 33 mole % to 35 mole % trifluoroethylene (TrFE) and 3.5 mole % to 4.5 mole % chlorofluoroethylene (CFE). In one specific embodiment the piezoelectric polymeric material contains about 62 mole % vinylidene fluoride (VDF), about 34 mole % trifluoroethylene (TrFE) and about 4 mole % chlorotrifluoroethylene (CTFE). If the halogenated ethylene based monomer containing at least one non-fluorine halogen atom is chlorotrifluoroethylene (CTFE) similar mole % ranges are typically utilised.

The source of electrical potential may be configured in a number of ways and may have any of a number of geometries depending upon the end use application, for example it may be a regular or an irregular shape. It may be relatively symmetrical or it may be in the form of a design on the security document. In general, however, the source of electrical potential is a regular shape and is typically a thin rectangular or square shape. An example of a suitable shape would be a 25 mm×25 mm square. The thickness of the source of electrical potential may vary depending upon the desired properties in the final security document. Nevertheless the thickness of the source of electrical potential is typically chosen such that the structural integrity of the source of electrical potential is not compromised by mechanical deformation of the security document whilst at the same time not impinging upon the flexibility of the finished security document. Typically, therefore, the source of electrical potential has a thickness of from 6-12 μm. In one form the source of electrical potential has a thickness of from 8-10 μm. Whilst the thickness may vary across the source of electrical potential in general it is desirable to maintain a constant thickness if possible.

The reporter element must be capable of switching electrically between a first state and a second state with the difference between the two states being able to be detected by an unaided human. In operation, therefore, once the source of electrical potential has been activated there is a voltage created across the source of stet which causes the reporter element to switch between the first state and the second state. The difference between the two states may be any of a number of differences that are able to be perceived. Examples of suitable differences of this type include differences such as colour changes, changes from a darkened state to a light state, heat changes between the states, auditory differences and the like.

In one embodiment the material in the reporter element is selected such that the first state and the second state are auditory states that are different in terms of auditory perception.

In this embodiment when switching between the first state and the second state a detectable noise is created. In general the first state will be a silent state and the second state will be a state that emits an audible noise for a period of time such that upon activation of the source of electrical potential an audible noise is emitted from the reporter element.

In another embodiment the material in the reporter element is selected such that the first state and the second state are optical states that are different in terms of ocular perception. Accordingly there is a visible change in the reporter element between the first state and the second state. An example of a reporter element that may be used that will demonstrate this change is a light emitting diode such as an organic light emitting diode (OLED). With a reporter element of this type typically the diode will change from an off state (darkened) to an on state (emitting light) upon activation of the source of electrical potential. In another form the reporter element may be a bi stable liquid crystal device. There are a number of changes between the first and second states that are able to be ocularly perceived. For example the reporter element may light up, flash, it may undergo a colour change, or it may undergo a change in tone. In relation to the reporter elements that change in tone, the reporter element may change from an opaque state to a transparent state and reveal a marking on the security document which is indicative of the authenticity of the security document.

The security documents of the invention incorporate conducting elements to form an electric circuit between the source of electric potential and the reporter element. The conducting elements may take any suitable form although typically the conducting elements are electrically conducting polymeric layers located either side of the source of electrical potential. Any suitable conducting element may be used although it is typically an electrically conducting polymeric material as these meet the requirements of flexibility and are readily able to be applied to security documents of this type. There are a number of suitable electrically conducting polymeric materials that may be used with an example being Poly(3,4-ethylenedioxythiophene) poly (styrenesulfonate), commercially available as Baytron™ SV3. The security documents of the invention also typically include an insulating layer positioned over the external electrically conducting layer to insulate the final security document.

The security documents of the invention may also include other electrical circuit components that may be incorporated into the security document. As such the security document may also include resistors, transistors, switches, diodes and the like that are configured so as to be part of the electric circuit containing the source of electrical potential.

The invention will now be discussed with reference to the Figures. With reference to FIG. 1 there is shown a security document substrate (1) with an insulation layer (2) applied thereto. Attached to a portion of the insulated layer is a reporter element (3). There are electrically conductive layers (4) and (6) which are in electrical contact with the reporter element and which are disposed either side of a source of electrical potential (5). In this configuration the electrically conducting layers complete an electric circuit with the source of electrical potential and the reporter element. In this example, the electrically conducting layers (4) and (6) include one or more circuit elements (8), such as resistors, transistors, capacitors, switches, diodes, inductors and the like. The circuit elements (8) may act in conjunction with the source of electrical potential to cause operation of the reporter element in a desired manner. In order to insulate the security document there is a second insulating layer (7) that covers the entire arrangement.

Figure 2:
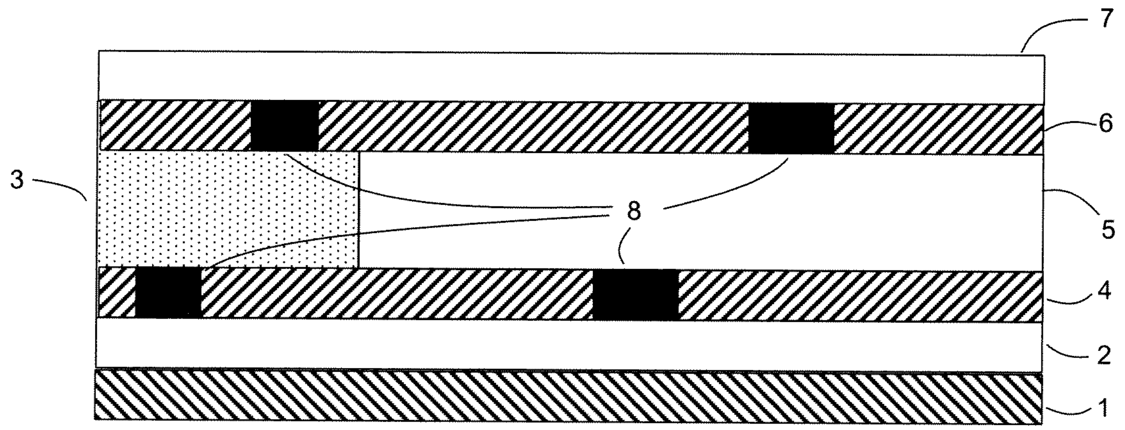
FIG. 2 illustrates another exemplary security document of the invention.

An alternative embodiment of a security document is shown in FIG. 2. In this embodiment there is a security document substrate (1) with an insulated surface (2). Applied to the surface is an electrically conducting layer (4) which extends along the surface of the substrate and is located between the substrate surface and the reporter element (3) and the source of electrical potential (5). A second electrically conducting layer (6) is located on the other side of both the reporter element (3) and the source of electrical potential (5) to complete the circuit. Once again, the electrically conducting layers (4) and (6) include one or more circuit elements (8). An insulating layer (7) is provided to complete the circuit.

Figure 3A:
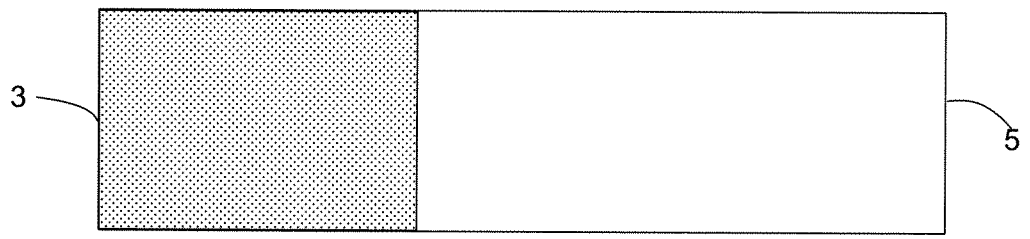
FIG. 3*a* is a schematic top view of a security document of the invention before activation of the source of electrical potential.
Figure 3B:
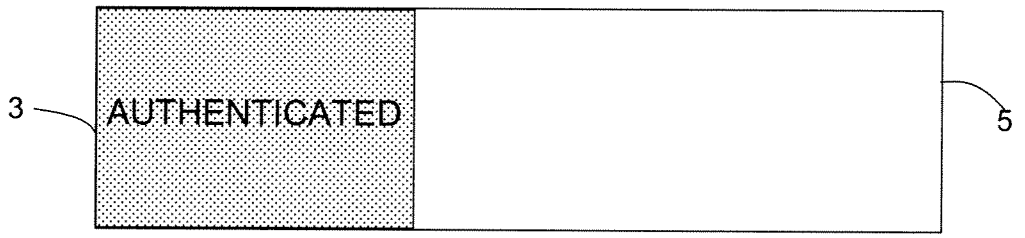
FIG. 3*b* is a schematic top view of a security document of the invention after activation of the source of electrical potential.

With reference to FIGS. 3*a* and 3*b* this demonstrates one potential way in which the device could operate. In FIG. 3*a* there is shown a top schematic view of a reporter element (3) in the off state such that it is opaque, attached to a source of electrical potential (5). Upon activation of the source of electrical potential (5) such as by deformation of the security document the reporter element (3) adopts a second optical state which in the case depicted in FIG. 3*b* is a transparent state. In this state any printing underneath the reporter element (in FIG. 3*b* shown by the exemplary text "AUTHENTICATED") will be visible.

Printable Piezoelectric Polymeric Material

The piezoelectric polymeric material which is applied to the security document can be prepared in a variety of ways. It is particularly advantageous if the piezoelectric polymeric material is in a form that can be printed. This enables the piezoelectric polymeric material to be applied to the security document by a printing process known to those familiar to the art, including through the use of gravure or silk screen printing. It will be appreciated that the printable piezoelectric polymeric material can be printed in a number of shapes and designs. The printable piezoelectric polymeric material is prepared by dissolving VDF:TrFE monomers in the solvent. Optionally the solvent is a mixture of Methyl iso butyl ketone and butyl glycol 10-20.

The halogenated ethylene based monomer containing at least one non-fluorine halogen atom, eg CFE or CTFE is then added. This results in a solution of the piezoelectric polymeric material which is suitable for printing.

Method of Manufacture of the Security Documents of the Invention

The present invention also provides a method of manufacture of the security documents of the invention.

Figure 4:
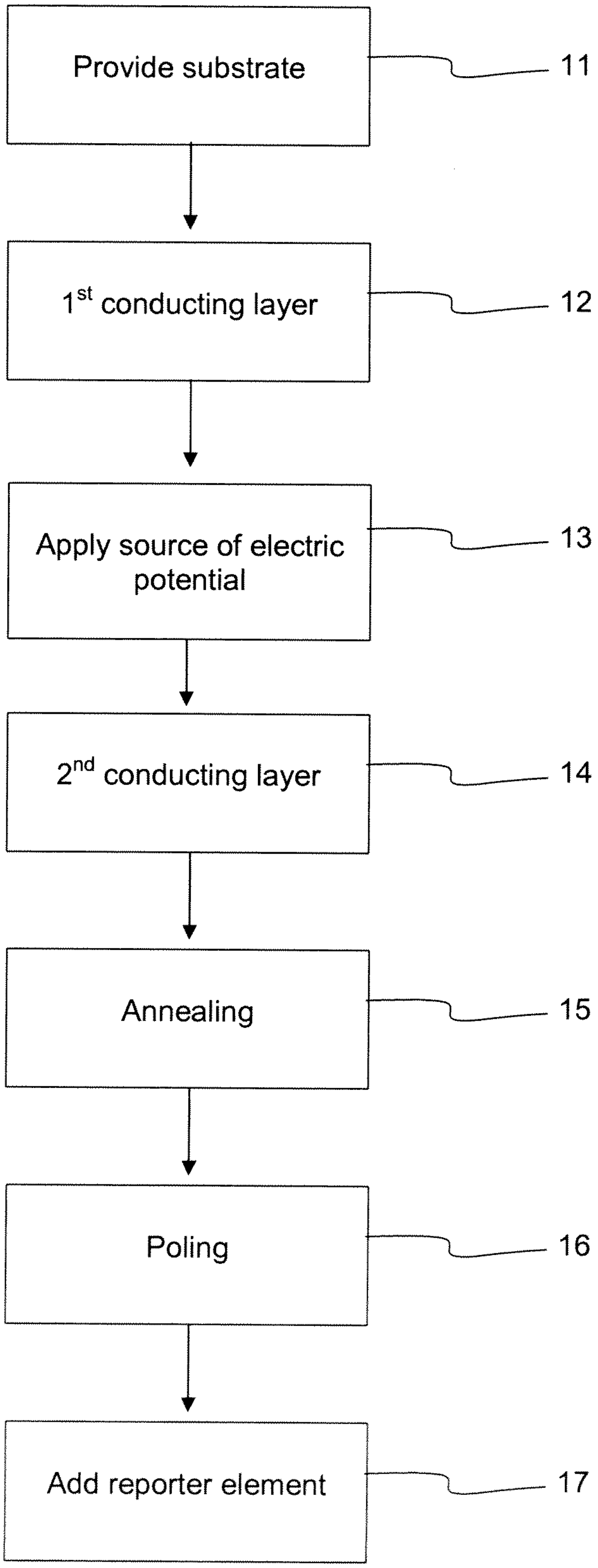
FIG. 4 is a process flow diagram of one embodiment of the method of the invention.

As shown in FIG. 4, the process of the invention starts with the provision (11) of a security document substrate having an insulated surface. With some security document substrates the surface is naturally insulated and no modification of the surface is required. This is the case for example with polymer banknotes which typically have an insulated surface. In circumstances where the surface is not insulated, however, it is necessary to apply an insulating material to at least a portion of the surface for application of the authentication device. It is found that if the surface is not insulated then when the source of electric potential is activated the voltage thus produced will be lost to the external environment rather than being used to electrically switch the reporter element. Any suitable insulating element may be used although it is typically a polymeric insulating material. The insulating material may extend across the entire substrate surface of the security document substrate or it may only be applied to the portion of the surface that the authentication device is to be attached to.

Once the insulated surface has been provided as discussed above, a first electrically conducting layer is applied (12) to the insulated surface. The electrically conducting layer, including any circuit elements (8) in that layer, may be made of any suitable electrically conducting material and it may be applied in any of a number of ways well known in the art. In one form the electrically conducting layer includes an electrically conducting polymeric material. An example of a suitable electrically conducting polymeric material is Poly (3,4-ethylenedioxythiophene) poly(styrenesulfonate), commercially available as Baytron™ SV3. The layer is preferably applied by printing. This typically involves the dissolution of the electrically conducting polymeric material in a suitable solvent to form a printing ink that is then typically printed using standard technology. For example the electrically conducting layer may be printed via a screen such as a 72 T screen. Any suitable solvent for the electrically conducting polymeric material may be used with the solvent chosen based on the identity of the electrically conducting polymeric material chosen. In relation to Poly (3,4-ethylenedioxythiophene) poly(styrenesulfonate), Baytron™ SV3, for example a suitable solvent is water.

The circuit elements included in the electrically conducting layer may advantageously be formed from a suitable polymeric material, and may be applied by printing. In this way, the source of electrical potential, the reporter element, the electrically conducting layers and any circuit elements included in the electrically conducting layers are all able to be applied to the security document by a suitable printing process.

Following application of the electrically conducting layer the source of electrical potential is then applied (13). This may be applied using any technique well known in the art but is suitably applied via a printing process. Whilst any printing process may be utilised this typically involves:

i) providing a solution of the piezoelectric polymeric material in a suitable solvent;

ii) printing the solution onto the electrically conducting layer; and iii) drying the printed solution.

The solution of the piezoelectric polymeric material in a suitable solvent is typically provided by dissolving the piezoelectric polymeric material of choice in a solvent selected such that it dissolves the piezoelectric polymeric material. The choice of solvent will depend upon the piezoelectric polymeric material chosen. In one embodiment the solvent is an organic solvent. In one form the organic solvent is a mixture of Methyl iso butyl ketone and butyl glycol 10-20. Once the solvent has been selected the piezoelectric polymeric material of choice is typically dissolved in the solvent at a suitable concentration to produce the desired printing ink for use in the process of the present invention. This may be done in a number of ways but typically involves addition of the piezoelectric polymeric material to an appropriate amount of solvent at elevated temperature with agitation until the piezoelectric polymeric material has dissolved. The ratio of piezoelectric polymeric material to solvent will vary depending upon the particular piezoelectric polymeric material and solvent chosen as well as the concentration of piezoelectric polymeric material in the final solution. Nevertheless it is typically desirable to have the concentration of piezoelectric polymeric material in the solvent as high as possible but not too high such as to make the printing of the solution onto the substrate unworkable. The amount of the piezoelectric polymer in the solvent may fall substantially in the range from about 15% to about 30% by weight. A suitable ratio is approximately 25 parts piezoelectric polymeric material to 75 parts solvent.

Once the solution has been provided the solution is then printed onto the security document using techniques well known in the art. In one form of this embodiment the solution is printed as a single pass with a 44 T screen mesh. In another form of this embodiment the solution is printed with two passes of a 77 T screen mesh.

After application of the solution, the printed solution is allowed to dry. This can be achieved either by the effluxion of time or the process can be accelerated by subjecting the printed security document to elevated temperature, reduced pressures or a combination thereof. It has been found that the printed solution can readily be dried by passing air at an elevated temperature over the printed surface. The air may be at any suitable temperature with the ideal temperature varying depending upon the solvent used. In general, however, with the solvents contemplated a temperature of 80° C. is found to be suitable. The printed solution is then typically dried to a solvent retention level of less than 5 mg/m$^3$ although it may be dried even further if desired.

Once the printed source of electrical potential has been suitably dried, a second electrically conducting layer is applied (14) to the source of electrical potential. Once again any suitable electrically conducting material may be used however it is typically an electrically conducting polymeric material such as Poly(3,4-ethylenedioxythiophene) poly (styrenesulfonate), commercially available as Baytron™ SV3.

The security document is then annealed (15) to promote crystal formation in the source of electrical potential which typically increases the power output of the device. Any suitable annealing technique may be used. In relation to piezoelectric polymeric materials these may be annealed at temperatures of from 80° C. to 120° C.

After annealing, the security document is then subjected to an external electrical field (16) to pole the source of electrical potential such that upon activation by deformation it produces the largest voltage. The strength of the electrical field may vary but is typically of the order of at least 45-50 V/μm based on the thickness of the source of electrical potential and higher electric fields may be used. The security document may be subjected to an external electrical field in a number of ways but this typically involves placing the security document in an electric field. The applied electric field may be any field suitable to induce a dipole in the source of electrical potential but with typical thicknesses involved of 6-10 μm the poling voltage may full substantially in the range from about 270V to about 800V. The exact strength of the applied field will depend upon the materials used to make the source of electrical potential and the thickness of the material.

The process also involves applying a reporter element (17) to the security document in electrical connection with the source of electrical potential, the reporter element including a material capable of switching electrically between a first state and a second state, the difference between the first state and the second state being able to be perceived by an unaided human. The reporter element may be added at any stage of the process and the timing of the addition of the reporter element will depend upon the nature of the reporter element chosen. Accordingly where the reporter element is a robust reporter element and it can withstand being subjected to the annealing conditions described above it may be applied at a very early stage of the process such as before or simultaneously with the application of the source of electrical potential. In circumstances where the reporter element is not robust it is typically added at the final stage of the process. The mode of application of the reporter element will depend upon the nature of the reporter element chosen. In general, however, once a reporter element is chosen it may be applied in any of a number of ways well known in the art for the application of a reporter element of that type. In one embodiment the reporter element is applied by printing.

Example 1

A security document substrate consisting of a polymer banknote was printed with a layer of Poly(3,4-ethylenedioxythiophene) poly(styrenesulfonate), commercially available as Baytron™ SV3 via a 72 T screen to produce an electrode layer.

A Poly(VDF:TrFE:CFE) (62 mole %:34 mole %:4 mole %) polymer was dissolved in Methyl Iso Butyl Ketone solution 25:75 at a temperature of 50° C. and the solution then further diluted with Butyl Glycol 10-20 to produce a screen ink that was printed with a 44 T screen mesh. The printed feature was dried with forced hot air at 80° C. to produce the source of electrical potential.

Another layer of Poly(3,4-ethylenedioxythiophene) poly (styrenesulfonate), commercially available as Baytron™ SV3 was printed via a 72 T screen to create a second electrode.

The security document was then annealed at a temperature of at least 70° C. to allow crystal formation.

A voltage of 0.8 KV DC was then applied to the 10 μm piezoelectric polymeric material to pole the device. A reporter element was then added in electrical connection with the source of electrical connection to complete the electric circuit.

Finally, it will be appreciated that various modifications and variations of the methods and security documents of the invention described herein will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are apparent to those skilled in the art are intended to be within the scope of the present invention.

The invention claimed is:

1. A flexible security document containing an authentication device, the authentication device including: a) a printed source of electrical potential, the source including a piezoelectric polymeric material comprised of a mixture containing: i) at least one terpolymer, wherein the terpolymer contains vinylidene fluoride (VDF), trifluoroethylene (TrFE) and a halogenated ethylene based monomer containing at least one non-fluorine halogen atom; and ii) a copolymer of vinylidene fluoride (VDF) and trifluoroethylene (TrFE), the source of electrical potential activatable by mechanical deformation of the flexible security document; b) a reporter element including a material electrically switchable between a first state and a second state when the source of electrical potential is activated; and c) conducting elements electrically connecting the source of electrical potential and the reporter element to produce an electric circuit, wherein when the flexible security document is mechanically deformed the source of electrical potential is activated, creating a voltage which switches the material in the reporter element between said first state and said second state and wherein a difference between said first state and said second state is observable by a change in at least one of optical state and audible noise.

2. A flexible security document according to claim 1 wherein the halogenated ethylene based monomer containing at least one non-fluorine halogen atom is chlorofluorethylene (CFE) or chlorotrifluoroethylene (CTFE).

3. A flexible security document according to claim 1 wherein the printed source of electrical potential has a thickness of from 6-12 μm.

4. A flexible security document according to claim 1 wherein upon activation, the printed source of electrical potential produces more than 50V.

5. A flexible security document according to claim 1 wherein the conducting elements are electrically conducting polymeric layers located on either side of the printed source of electrical potential.

6. A flexible security document according to claim 5 wherein at least one electrically conducting polymeric layer includes one or more circuit elements.

7. A method of manufacturing a flexible security document containing a security document authentication device, the method including: a) providing a flexible security document substrate having an insulated surface for application of a security document authentication device, b) applying a first electrically conducting layer to the insulated surface; c) printing a source of electrical potential onto a portion of the electrically conducting layer, the printable source of electrical potential including a piezoelectric polymeric material comprised of a mixture containing: i) a terpolymer, wherein the terpolymer contains vinylidene fluoride (VDF), trifluoroethylene (TrFE) and a halogenated ethylene based monomer containing at least one non-fluorine halogen atom; and ii) a copolymer of vinylidene fluoride (VDF) and trifluoroethylene (TrFE); d) annealing the security document; e) subjecting the security document to an external electrical field to pole the device; and f) applying a reporter element to the security document in electrical connection with the source of electrical potential, the reporter element including a material capable of switching electrically between a first state and a second state when the source of electrical potential is activated by mechanical deformation to create a voltage, wherein a difference between the first state and the second state is observable by a change in at least one of optical state and audible noise.

8. A flexible security document containing an authentication device, the authentication device including: a) a printed source of electrical potential, the source including a piezoelectric polymeric material comprised of a mixture containing: i) at least one terpolymer, wherein the terpolymer contains vinylidene fluoride (VDF), trifluoroethylene (TrFE) and a halogenated ethylene based monomer containing at least one non-fluorine halogen atom; and ii) a copolymer of vinylidene fluoride (VDF) and trifluoroethylene (TrFE), the source of electrical potential activatable by mechanical deformation of the flexible security document; b) a reporter element including a material electrically switchable between a first state and a second state when the source of electrical potential is activated; and c) conducting elements electrically connecting the source of electrical potential and the reporter element to produce an electric circuit, wherein when the flexible security document is mechanically deformed the source of electrical potential is activated, creating a voltage which switches the material in the reporter element between said first state and said second state and wherein a difference between said first state and said second state is observable by a change in an optical state, and wherein the material in the reporter element is selected such that the first state and the second state are optical states that are different in terms of ocular perception.

9. A flexible security document according to claim 8 wherein the reporter element is an organic light emitting diode (OLED) or a bi stable liquid crystal device.

10. The method of claim 7 wherein said activation of the electrical potential is a result of converting mechanical energy directly to electrical energy.

11. A method according to claim 7 wherein applying a first electrically conducting layer to the insulated surface includes applying a conducting polymer to the surface.

12. A method according to claim 7 wherein applying the printable source of electrical potential includes i) providing a solution of the piezoelectric polymeric material in a solvent;

ii) printing the solution onto the first electrically conducting layer; and iii) drying the printed solution.

13. A method according to claim 12 wherein the printed solution is dried to a solvent retention level of less than 5 $mg/m^3$.

14. A method according to claim 7 wherein the security document is annealed at a temperature falling within the range from about 70° C. to about 150° C.

15. A method according to claim 7 wherein the security document is subjected to an external electrical field of at least 45 V per μm of thickness of the source of electrical potential.

16. A method according to claim 7 wherein the security document is subjected to a poling voltage falling within the range from about 270V to about 800V.

17. The method of claim 7 further including applying a second electrically conducting layer to the source of electrical potential.

* * * * *